(12) United States Patent
Noel et al.

(10) Patent No.: US 7,555,778 B2
(45) Date of Patent: Jun. 30, 2009

(54) MINIMUM-COST NETWORK HARDENING

(75) Inventors: Steven E. Noel, Woodbridge, VA (US); Sushil Jajodia, Oakton, VA (US); Brian C. O'Berry, North Potomac, MD (US); Michael A. Jacobs, Tulsa, OK (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 800 days.

(21) Appl. No.: 11/250,449

(22) Filed: Oct. 17, 2005

(65) Prior Publication Data

US 2006/0085858 A1    Apr. 20, 2006

Related U.S. Application Data

(60) Provisional application No. 60/619,875, filed on Oct. 19, 2004, provisional application No. 60/659,895, filed on Mar. 10, 2005.

(51) Int. Cl.
*G06F 12/14* (2006.01)
*G06F 7/04* (2006.01)
*G06F 15/173* (2006.01)

(52) U.S. Cl. ............................... 726/25; 726/3; 726/23; 709/224

(58) Field of Classification Search ..................... 725/25
See application file for complete search history.

(56) References Cited

U.S. PATENT DOCUMENTS

| | | | | |
|---|---|---|---|---|
| 7,152,105 B2* | 12/2006 | McClure et al. | ............ | 709/224 |
| 7,162,649 B1* | 1/2007 | Ide et al. | ..................... | 713/165 |
| 7,178,166 B1* | 2/2007 | Taylor et al. | .................. | 726/25 |
| 7,237,264 B1* | 6/2007 | Graham et al. | ................ | 726/23 |
| 7,243,148 B2* | 7/2007 | Keir et al. | .................... | 709/224 |
| 7,257,630 B2* | 8/2007 | Cole et al. | .................. | 709/224 |
| 7,302,707 B1* | 11/2007 | Weber et al. | .................. | 726/25 |
| 7,340,776 B2* | 3/2008 | Zobel et al. | .................... | 726/24 |
| 7,392,545 B1* | 6/2008 | Weber et al. | .................. | 726/25 |

OTHER PUBLICATIONS

Steven Noel, Sushil Jajodia, "Managing attack graph complexity through visual hierarchical aggregation," Oct. 2004, VizSEC/DMSEC '04: Proceedings of the 2004 ACM Workshop on Visualization and data mining, pp. 109-118.*

Peng Ning, Yun Cui, Douglas Reeves, Dingbang Xu, "Techniques and tools for analyzing intrusion alerts," May 2004, ACM: Transactions on Information and System Security (TISSEC), vol. 7, issue 2, pp. 274-318.*

Steven Noel, Sushil Jajodia, Brian O'Berry, Michael Jacobs, "Efficient Minimum-Cost Network Hardening via Exploit Dependency Graphs," Dec. 2003, Proceedings of the 19th Annual Computer Security Applications Conference.*

* cited by examiner

*Primary Examiner*—Kaveh Abrishamkar
(74) *Attorney, Agent, or Firm*—David Grossman

(57) ABSTRACT

Disclosed is a network hardening mechanism. The mechanism: generates a dependency graph from a multitude of exploits; constructs a goal conditions expression which may then be used to determine set(s) of safe network configurations. A subset of these safe network configuration sets may then be selected for implementation using hardening costs as a criterion.

20 Claims, 10 Drawing Sheets

| Exploit | Description |
|---|---|
| arp_spoof | Spoof (impersonate) machine identity via ARP poison attack |
| ypcat_passwd | Dump encrypted NIS password file |
| crack_passwd | Crack encrypted user password(s) |
| scp_upload_pw | Secure shell copy, upload direction, using password authentication |
| scp_download_pw | Secure shell copy, download direction, using password authentication |
| ssh_login_pw | Secure shell login using password authentication |
| rh62_glibc_bof | Red Hat 6.2 buffer overflow in glibc library |
| create_nfs_home_ssh_pk_su | Exploit NFS home share to create secure shell key pair used for superuser authentication |
| ssh_login_pk_su | Secure shell login using public key authentication |

FIG. 8

| Exploit | Description |
|---|---|
| link_arp | Attacker shares link-level connectivity with victim (both on same LAN) |
| trans_yp | Transport layer connectivity to NIS server |
| trans_ssh_pw | Transport layer connectivity to secure shell server that supports password authentication |
| trans_ssh_pk | Transport layer connectivity to secure shell server that supports public key authentication |
| trans_nfs | Transport layer connectivity to NFS server |
| app_nfs_home_su | Application "connection" representing sharing superuser's home directory |
| app_yp_domain | Application "connection" representing NIS domain membership |
| app_yp_passwd | Application "connection" representing acquisition of encrypted NIS password database |
| app_pwauth | Application "connection" representing acquisition of unencrypted user password |
| app_ssh_pk_su | Application "connection" representing acquisition/creation of key pair used for superuser authentication |
| pgm_glibc_bof | Program used to exploit glibc library buffer overflow vulnerability |
| execute | Execute access obtained |
| superuser | Superuser privilege obtained |

FIG. 9

MINIMUM-COST NETWORK HARDENING

CROSS-REFERENCE TO RELATED APPLICATIONS

This application claims the benefit of: U.S. Provisional Application No. 60/619,875, filed Oct. 19, 2004, entitled "Minimum-Cost Network Hardening;" and U.S. Provisional Application No. 60/659,895, filed Mar. 10, 2005, entitled "Minimum-Cost Network Hardening;" which are both hereby incorporated by reference in their entirety.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of Grants No.: W911QX-04-C-0101 awarded by ARL; DAAD19-03-1-0257 awarded by ARO; and F30602-00-2-0512 awarded by USAF/Rome Lab.

BACKGROUND OF THE INVENTION

In the analysis of network vulnerability to attack, considering vulnerabilities in isolation is insufficient. This is because attackers often combine exploits against multiple vulnerabilities in order to reach their goals. While a single vulnerability may not pose a significant threat to a network, a combination of vulnerabilities may. Thus even well administered networks can be vulnerable to attacks, because of the security ramifications of offering a variety of combined services.

An approach to this problem is to build a model of global network security, e.g., as a state machine with security conditions as variables and attacker exploits as transitions. Various methods have been proposed for finding attack paths (sequences of exploit state transitions) in such models, including symbolic model checker (logic-based) approaches [1] [2] [3] [4], and graph-based approaches [5] [6] [7] [8] [9]. However, such methods generally have serious scalability problems, since they must contend with the exponential complexity of the full security state search space.

More recently [10] [11], it has been recognized that under an assumption of monotonic logic, it is not necessary to represent attack paths (usually organized as graphs) explicitly. Instead, the dependencies among exploits and security conditions may encode the same information provided by attack graphs. Monotonic logic may lead to an efficient (low-order polynomial) exploit dependency graph representation that scales well. Semantically, monotonic logic simply means that the attacker need not relinquish resources already gained in order to further advance the attack. This can be a valid modeling decision, corresponding to the observation that the control that attackers exert over networks effectively increases monotonically over time.

Attack graphs (and even exploit dependency graphs) show sequences of exploits, which may be useful for applications that focus on the attacks themselves. But network administrators usually don't care about exploit sequences—they just want to know the best way to harden their network. What is needed is an explicit and manageable set of network hardening options that provide for the safety of given network resources.

BRIEF DESCRIPTION OF THE SEVERAL VIEWS OF THE DRAWING(S)

The accompanying drawings, which are incorporated in and form a part of the specification, illustrate an embodiment of the present invention and, together with the description, serve to explain the principles of the invention.

FIG. 8 is a table of Exploits for a second example.

FIG. 9 is a table of security conditions for a second example.

DETAILED DESCRIPTION OF THE INVENTION

Figure 1:
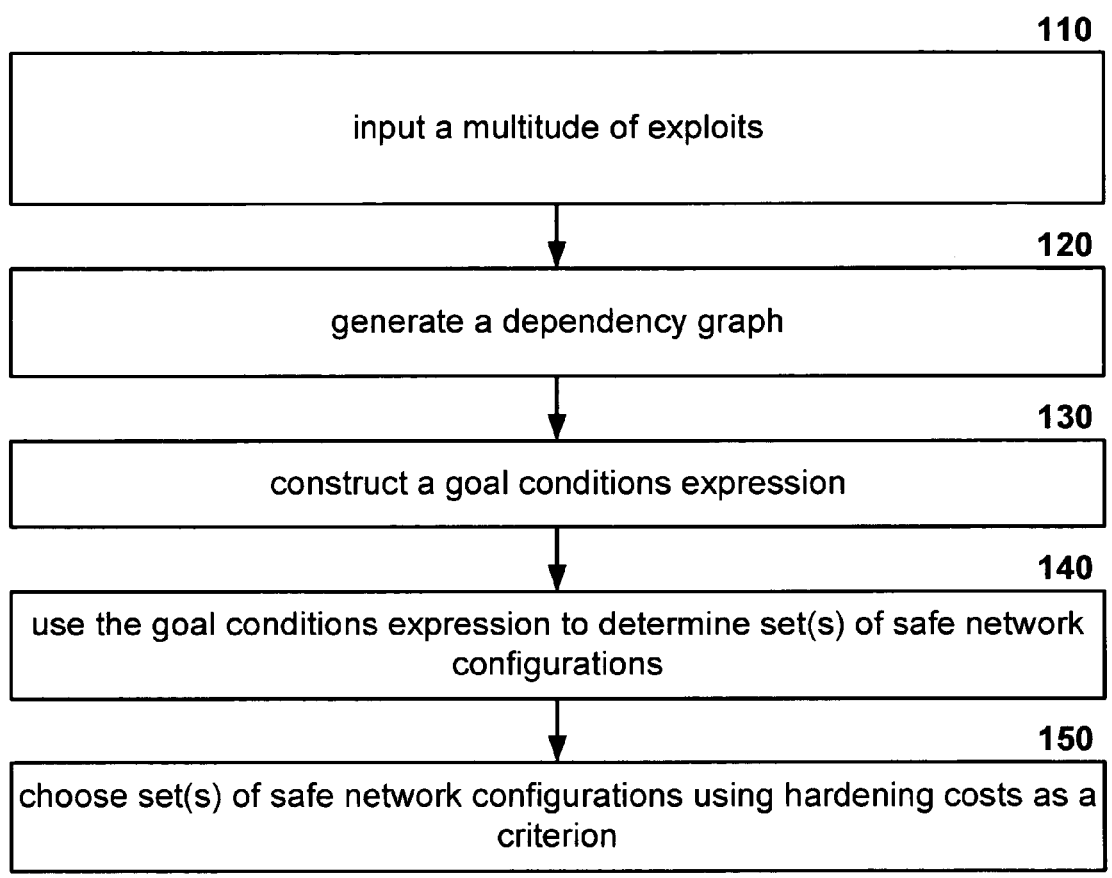
FIG. 1 is a flow diagram of as aspect of an embodiment of the present invention.

Embodiments of the presently claimed invention are minimum-cost network hardening system(s) capable of utilizing an explicit and manageable set of network hardening option(s) for providing for the safety of given network resources.

In-depth analysis of network security vulnerability should consider attacker exploits not just in isolation, but also in combination. The general approach to the presently disclosed embodiments is to compute attack paths (combinations of exploits), from which one can decide whether a given set of network hardening measures provide for the safety of given critical resources. Presently disclosed embodiments go beyond attack paths to compute actual sets of hardening measures (assignments of initial network conditions) that provide for the safety of given critical resources. Moreover, for given costs associated with individual hardening measures, assignments that minimize overall cost may also be computed. By doing minimization at the level of initial conditions rather than exploits, hardening irrelevancies and redundancies may be resolved in a way that cannot be done through previously proposed exploit-level approaches. Also, exploit-dependency representations based on monotonic logic that have polynomial complexity, as opposed to many previous attack graph representations having exponential complexity may be used.

Some embodiments go beyond attack paths and exploit dependency graphs to compute actual network hardening options. In addition to safety options, these hardening options may incur minimal overall cost, assuming relative costs have been given for individual hardening measures. Previous approaches have addressed this problem by computing minimal critical sets of exploits [3] [4] [10]. But such approaches ignore the generally complex relationships among exploits and elements of the network configuration. The presently disclosed approach works directly with configuration elements, resolving hardening irrelevancies and redundancies in a way that cannot be done through exploit-level approaches.

While the possible number of hardening options can be large, the number of choices may be greatly reduced by selecting only those with minimal impact on the network. In particular, a "minimal" safe network configuration, in which a given set of components are hardened, allows other configurations in which supersets of these same components are hardened to be ignore.

These minimal-impact configurations may lead directly to minimum-cost hardening options. That is, the only costs incurred are those associated with hardened network components, and the minimal-impact configurations correspond to fewer numbers of such components. Using relative costs assigned for individual hardening measures (possibly by a network administrator), the configuration with the lowest total cost may be selected.

As described in subsequent sections, an efficient exploit dependency graph representation in computing network hardening measures may be used. In building the exploit dependency graph, cycles and other redundancies may be resolved via graph distance from initial conditions, as consistent with monotonic logic.

From the exploit dependency graph, an expression of the safety of given network resources may be computed in terms of possible assignments of initial network conditions. Then minimal-impact network configurations via the minimal elements of the conjunctive-normal-form partial ordering may be computed. From these minimal-impact configurations, the configuration with minimum total cost may be found.

Problem

The problem of computing minimum-cost hardening measures that provide for network safety is now considered. In this problem, the presence of a network security condition may be modeled as a Boolean variable. For example, if some condition represents a vulnerable version of a software component on a particular machine, the condition being true means the component is present and the condition being false means it is not present. Under the assumption of monotonicity, a condition may go from false to true, but may not go from true to false. That is, once a condition contributes to the success of an exploit (or overall attack), it will continue to do so.

Next, the success of an attacker exploit as a Boolean function of some set of conditions may be modeled. While it is possible for such an exploit to take on a general Boolean form, for simplicity the exploit may be constrained to a conjunction (Boolean ANDs). There is no loss of generality here, since if an exploit requires disjunction (e.g. more than one version of a vulnerable program), the disjunctive portions of the exploit may simply be divided into separate (conjunctive) exploits and considered separately.

The success of an exploit may then cause another set of conditions to become true. In other words, an exploit is a mapping from its preconditions to its postconditions, such that if all its preconditions are true then all its postconditions become true.

Given a network-attack model, the next step is to determine how the application of exploits impacts network vulnerability. As described earlier, previous work in this area has generally focused on generating attack paths that lead to the compromise of a given critical resource. That is, some set of conditions is designated as the goal of the attack. Distinct sequences of exploits (attack paths) are then generated such that each sequence leads to the attack goal becoming true.

The general idea is that one could use attack paths (arranged as a graph) to determine network-hardening measures. However, such attack graph representations have high complexity, so that this approach may not scale well.

Aspects of the presently disclosed invention go beyond attack graphs, computing sets of network hardening measures via efficient exploit dependency graphs. That is, given a set of initial conditions, assignments of those conditions that provide for the safety of a set of attack goal conditions are computed. Moreover, hardening measure assignments that have minimum cost, corresponding to minimizing assignments of false to initial conditions, (i.e., minimizing the number of hardening measures to be taken) may also be computed.

Here it is important to distinguish between two types of network security conditions. One type of condition appears as an exploit precondition only. The only way that such conditions can be true is if they are true initially, since they are postconditions of no exploit. These initial conditions are precisely the ones which should be considered for network hardening measures.

The other type of condition appears as both exploit preconditions and postconditions. Such conditions may not be considered for network hardening, since they are not under the strict control of the network, i.e. attacker exploits can potentially make them true despite added hardening measures.

In computing minimal-impact hardening sets, one set can be chosen over another if all its assignments of false also appear in the other set. This is true because the selected set represents a safe assignment with fewer hardened network components. By retaining only these minimal-impact hardening sets, hardening cost may be minimized, greatly reducing the number of sets to consider.

If a network administrator has no a priori way to assign individual hardening costs, one could simply compute all possible minimal-impact sets. Armed with all possible sets, the administrator could then select the best one. If an assumption is made that individual hardening costs are equal, then the set of all possible minimal-impact assignments could be reduced to a single best minimal-impact assignment. This assignment would thus be the one with the fewest hardening measures, i.e., the one with the fewest assignments of false initial conditions.

The more realistic scenario that different hardening measures incur different costs (although it is not always trivial to assign such costs) may also be considered. Assuming that costs are independent and combine linearly, the overall cost of a particular hardening assignment is just the sum of the costs of the individual hardening measures taken. In this way, from among all minimal-impact hardening sets, the single set whose total cost is lowest may be chosen.

Approach

Beginning with a set of exploits in terms of security conditions, a directed graph of the dependencies among exploits and conditions may be built, via exploit preconditions and postconditions. The dependency graph may be built through a multi-step process, implemented through a custom application using a language such as Java. First, a dependency graph starting from an "initial conditions" exploit may be built, i.e., an exploit with the initial network conditions as its postconditions (and null preconditions). The resulting graph represents forward dependencies from the initial conditions.

In building the forward-reachable dependency graph, cycles may be resolved through the graph distances (number of vertices in shortest path) that given conditions are from the initial conditions. That is, preference is preferably given to dependency edges that are closer to the initial conditions. Because such a resolved dependency graph is sufficiently well behaved, it may be used to construct a closed-form expression for the attack goal in terms of the initial conditions.

Actually, the resolution of cycles may be part of a more general resolution of postcondition redundancies. That is, there may be no reason to cycle among exploits if their postconditions remain true after an initial exploit execution, neither is there reason to execute exploits whose postconditions have already been met. Cycles and other redundancies are common in real networks, and are violations of monotonicity that should be resolved. Indeed, in the real world, attackers themselves would avoid such redundancies.

Next a backward traversal of the forward-reachable dependency graph may be performed, starting from the "attack goal" exploit, i.e., an exploit with the attack goal(s) as its preconditions (and null postconditions). The resulting dependency graph most likely includes exploits that are not only reachable from the initial conditions, but are also relevant to (i.e. backward reachable from) the attack goal. In fact, this dependency comprises the necessary and sufficient set of exploits with respect to the initial and goal conditions, i.e., all exploits can actually be executed, and all exploits contribute to the attack goal. This represents the set of minimal attack paths, in which no exploit can be removed without impacting the overall attack.

Given an exploit dependency graph, an expression for the goal conditions in terms of the initial conditions may then be constructed. This may involve the recursive algebraic substitution of dependency terms in a backward direction, starting from the goal-condition exploit. That is, start from the goal exploit, and algebraically substitute it with the conjunction of its preconditions.

Then, substitute each of the goal-condition preconditions with the exploit that yields it as a postcondition, since these are logically equivalent. In the event that more than one exploit yields this postcondition, form the disjunction of all such exploits, since logically any one of them could provide the postcondition independent of the others.

Continuing in a recursive fashion, substitute the newly generated exploit expressions in the same way the goal-condition exploit expression was treated. In doing this recursive algebraic substitution, direct use of the exploit dependency graph is made by traversing it breadth-first. Recursion should end when the initial-condition exploit is encountered. It is at this point that an initial condition has been added to the expression. Once the dependency graph has been fully traversed, the result should be an expression for the safety of the attack goal in terms of the initial conditions.

The resulting expression for the attack goal allows for a decision of whether the goal is safe for a particular assignment of initial conditions. But, there should be concern regarding the assignment version of this problem, i.e., actually finding sets of initial conditions that provide for safety. This may be more useful from the standpoint of network vulnerability analysis, since it provides explicit sets of safe network configurations.

To solve the assignment problem, the properties of the conjunctive normal form [12] may be relied upon. The canonical conjunctive normal form should yield the attack goal written as a uniquely determined conjunction of maxterms, where each maxterm is a disjunction that contains all initial conditions.

Each maxterm should correspond to an assignment of initial conditions such that the attack goal is safe. In particular, if each non-negated initial condition in a maxterm is false, the attack goal should be false (safe), independent of any other maxterm. The set of all maxterms thus should represent all possible safe assignments.

To minimize hardening costs, assignments with minimal hardening measures may be chosen. More formally, choose one maxterm over another if all of its non-negated conditions also appear non-negated in the other. In other words, choose one maxterm over another if the non-negated conditions in the first are a (proper) subset of the non-negated conditions in the second.

Not all maxterms can be ordered according to this property, i.e., one maxterm's non-negated conditions may not be a subset of another's, so this is a partial order. In terms of this partial ordering of maxterms, then choose minimal maxterms, i.e. those that are greater than no other maxterm. It is preferable to choose these precisely because they correspond to minimal hardening measures.

While the total number of maxterms can potentially grow exponentially with the number of initial conditions, choosing only minimal-impact maxterms can drastically reduce the number of sets to consider. Actually, the number of maxterms can be critically dependent on the exact form of the attack goal expression. At one extreme, for a purely conjunctive expression, there is only one maxterm. At the other extreme, for a purely disjunctive expression with n initial conditions, there are $2^n-1$ maxterms. But in general, there can be large numbers of maxterms, so it may be crucial to reduce them in the way we describe.

Computation of the full set of minimal-impact hardening options could be stopped if there are no known criteria for assigning individual hardening costs. The various options may be compared and the option that offers the best combination of offered services selected. It is possible to go further by assuming that all hardening measures are equally costly. From this, the minimal-impact maxterm with the smallest number of unprimed (non-negated) terms could be chosen.

However, there are additional steps that could be performed in trying to capture the least costly set of hardening measures. In particular, costs could be assigned to individual hardening measures. An assumption that the overall cost of a set of hardening measures can be accurately modeled as the sum of the individual costs may be made. Thus the total cost $p(m_i)$ of maxterm $m_i$ may be written as $$p(m_i) = \sum_i w_j^i a_j^i,$$

with $a_i^j$ being a primed (negated) initial condition within maxterm $m_i$ with cost $w_i^j$. The maxterm with the smallest total cost may be selected as the single best choice for network hardening.

EXEMPLARY EMBODIMENT 1

One embodiment of the present invention includes a tangible computer-readable medium encoded with a computer program for minimum-cost network hardening. The computer program when executed by processor(s) causes the processor(s) to execute a series of steps. The steps may be seen in FIG. 1 and include: inputting a multitude of exploits (Step 110); generating a dependency graph (Step 120); constructing a goal conditions expression (Step 130); using the "goal conditions expression," to determine set(s) of safe network configurations (Step 140); and choosing set(s) of safe network configurations" using hardening costs as a criterion (Step 150).

The exploits may include precondition(s) mapped to postcondition(s). Precondition(s) and postconditions may include elements of a computer network that contribute to a network attack vulnerability. At least one of the exploits should be an initial-condition exploit. Initial-condition exploits may represent an initial configuration of a network. Alternatively, initial-condition exploits may also have null precondition(s). At least one of the preconditions should be a logical combination of multiple preconditions.

Figure 2:
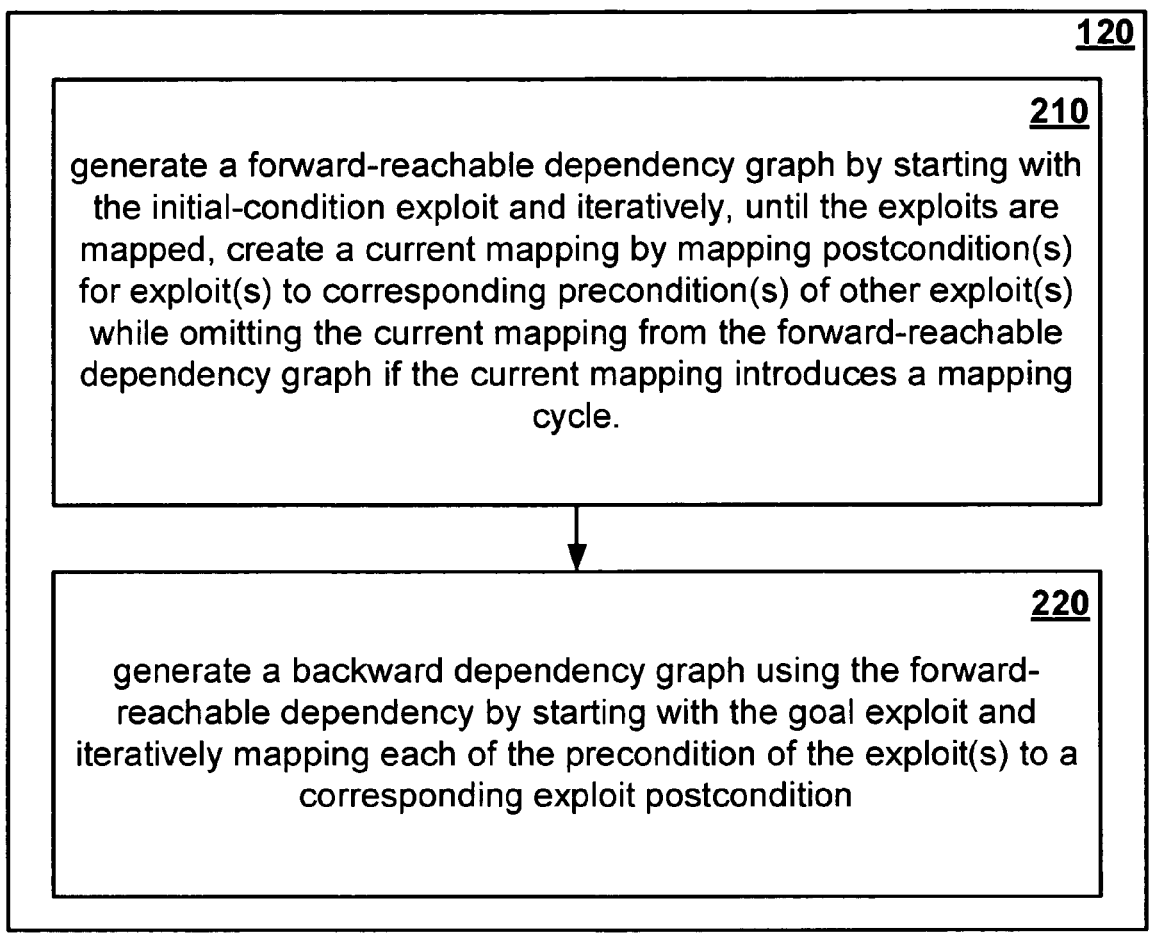
FIG. 2 is a flow diagram of as aspect of an embodiment of the present invention.

FIG. 2 is a flow diagram showing how a dependency graph may be generated (step 120). First, a forward-reachable dependency graph is generating (step 210) and then a backward dependency graph using the "forward-reachable dependency graph" is generated (step 220). On e way to generate a forward-reachable dependency graph (step 210) is to starting with the initial-condition exploit, iteratively until the exploits are mapped, create a current mapping by mapping postcondition(s) for exploit(s) to corresponding precondition(s) of other exploit(s) while omitting the current mapping from the forward-reachable dependency graph if the current mapping introduces a mapping cycle. The backward dependency graph may be generated using the "forward-reachable dependency graph" by starting with the "goal exploit" and iteratively mapping each of the precondition of the exploit(s) to a corresponding exploit postcondition (step 220).

At least one of the exploits should be a goal exploit. The "goal exploit" preferably represents a network attack goal. The goal conditions expression may be constructed (step 130) using the "dependency graph" by starting with the "goal exploit," and for each of the exploits" mapped on the "dependency graph," recursively: mapping each the precondition(s) to the corresponding postcondition(s) and then substituting the associated logical combination of multiple preconditions with a corresponding algebraic expression. This corresponding algebraic expression may be written as a conjunction of disjunctions, where each of the "disjunctions" contains safe network configuration initial conditions.

Hardening measures may be considered changes to the network configuration that remove at least one attack vulnerability. When choosing set(s) of safe network configurations" using hardening costs as a criterion may include several aspects. For example, it may include performing a partial ordering analysis of safe network configurations. The criterion may include: choosing safe network configurations with minimal hardening measures, or alternatively choosing the safe network configuration with the lowest hardening costs measures. To assist in evaluating the criterion, a cost may be assigned to each hardening measure.

EXEMPLARY EMBODIMENT 2

Figure 3:
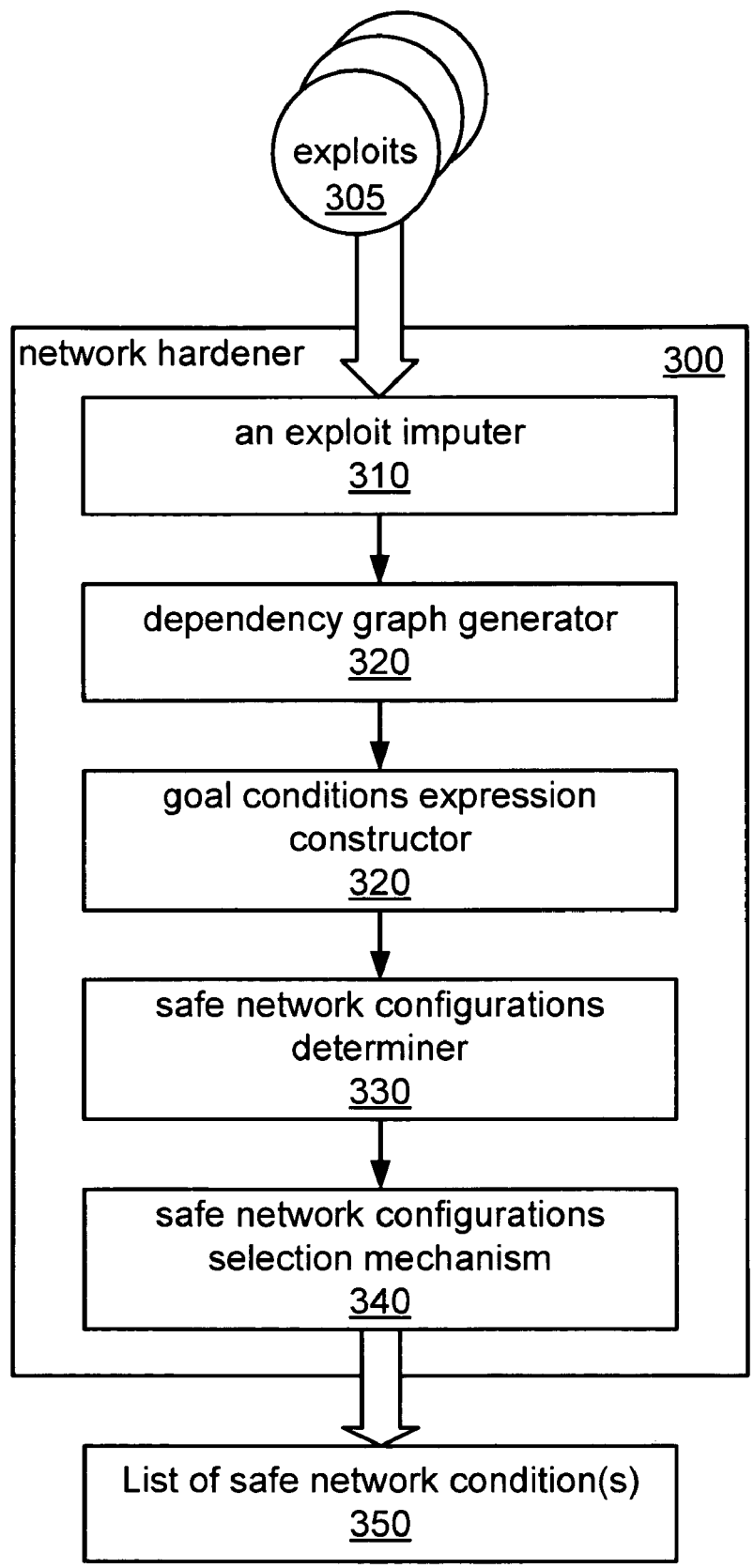
FIG. 3 is a block diagram of as aspect of an embodiment of the present invention.

The computer program for minimum-cost network hardening may be viewed as a network hardener 300 comprising a series of functional blocks as shown in FIG. 3. The blocks include: an exploit imputer 310; a dependency graph generator 320; a goal conditions expression constructor 320; safe network configurations determiner 330; and a safe network configurations selection mechanism 340.

The exploit imputer 310, is preferably configured to receive exploits 305. The exploits should each have precondition(s) mapped to postcondition(s). Preconditions and postconditions generally include elements of a computer network that contributes to a network attack vulnerability. Precondition(s) may be a logical combination of multiple preconditions.

At least one of the exploits should be an initial-condition exploit. Initial-condition exploits generally represent the initial configuration of a network. However, an initial-condition exploit can in some circumstances be a null precondition.

At least one other of the exploits should be a goal exploit. Goal exploits generally represent a network attack goal.

The dependency graph generator 320 is preferably configured to generate dependency graph(s). This may be done by generating a forward-reachable dependency graph and then generating a backward dependency graph using the "forward-reachable dependency graph. The forward-reachable dependency graph may be generated by starting with the initial-condition exploit and iteratively: creating a current mapping by mapping postconditions to corresponding preconditions and omitting the current mapping from the forward-reachable dependency graph if the current mapping introduces a mapping cycle. The backward dependency graph may be generated using the forward-reachable dependency graph by starting with the goal exploit and iteratively mapping preconditions to corresponding postconditions.

The goal conditions expression constructor 320 is preferably configured to construct a goal conditions expression using the dependency graph. This may be done by starting with the goal exploit, and for each of the exploits mapped on the dependency graph, recursively: mapping preconditions to corresponding postconditions; and then substituting the associated logical combination of multiple preconditions with a corresponding algebraic expression. Goal conditions expression may be written as a conjunction of disjunctions, where each of the "disjunctions" contains safe network configuration initial conditions.

The safe network configurations determiner 330 is preferably configured to determine at least one set of safe network configurations using the "goal conditions expression; and a safe network configurations selection mechanism. This may include performing a partial ordering analysis of safe network configurations.

The safe network configurations selection mechanism 340 is in turn preferably configured to choose at least one of a set of safe network configurations using hardening costs as a criterion. This may be done in a number of ways including: choosing the set of safe network configurations' with the lowest hardening costs; and choosing safe network configurations with minimal hardening measures. Hardening measures may include changes to the network configuration that remove at least one attack vulnerability. Costs may be assigned to each hardening measure to assist in evaluating the hardening cost criterion.

EXAMPLES

In this section, some example applications are provided. First, a small example that has been described in previous work, which demonstrates aspects of the presently disclosed invention is worked through. Then, a slightly more elaborate example is considered that underscores how this approach yields concise sets of hardening measures with minimal cost (e.g., minimal impact on network service availability), eliminating irrelevant security conditions in a way not possible through previous exploit-level approaches.

In the first example, the attacker's machine is denoted machine 0, and the two victim machines are denoted 1 and 2, respectively. The details of the attack scenario (such as network topology, available services, operating systems, etc.) are not needed here, although the interested reader can refer to [3] and [10] for such details. For the purpose of describing the approach, all which is really needed is the exploit dependency graph as described in the previous section.

Figure 4:
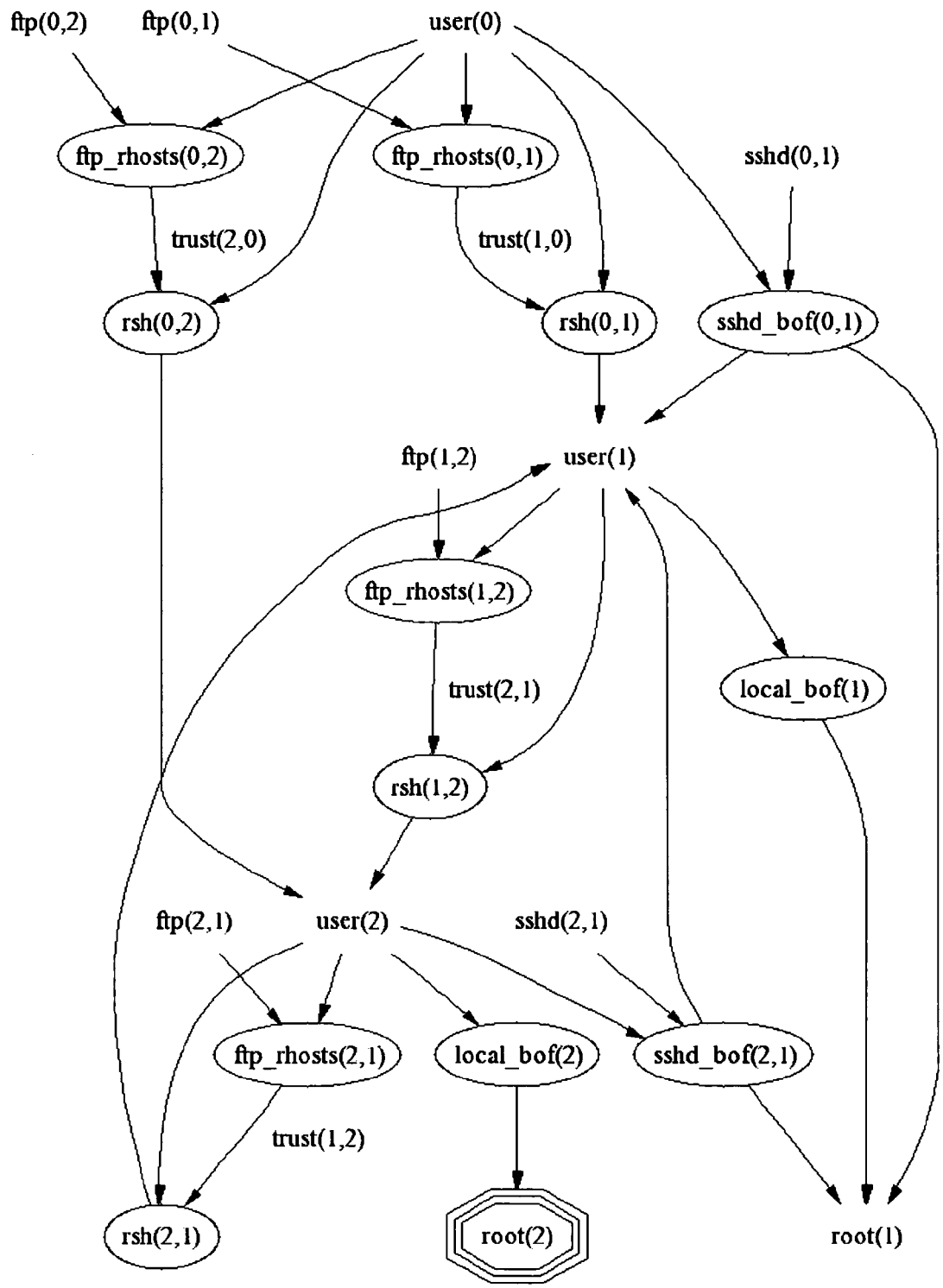
FIG. 4 is an example exploit dependency graph.

FIG. 4 shows the full attack dependency graph for this example, before applying the analysis described in the previous section. In the figure, exploits appear as ovals, and conditions appear as plain text (except the goal condition, which is marked with a triple octagon). Numbers in parenthesis identify associated machines. For example, root(2) denotes root privilege on machine 2, and rsh(2,1) denotes the execution of the rsh exploit from machine 2 to machine 1.

In comparison to the original examples in [3] and [10], one may notice that some exploit preconditions are missing. This is because some modeling changes were made to eliminate redundancy, which in turn reduces model complexity. For example, without loss of generality, modeled were the combination of transport-layer ftp connectivity, physical-layer connectivity, and the existence of the ftp daemon as simply transport-layer ftp connectivity (see [13] for details). Similarly, the combination of application-layer trust and physical-layer connectivity as simply application-layer trust were modeled. Also, we represent the privilege level of "none" implicitly, i.e. as the absence of a defined level.

The dependency graph in FIG. 4 shows all exploits that can possibly be executed. [Note that FIG. 4 omits exploits in which the attacker's own machine is the victim. That is, no exploits need be launched against the attacker's own machine, since all attacker capabilities can simply be modeled as initial conditions. The figure also omits the initial-condition and goal-condition exploits described in the previous section, which are algorithmically convenient but have little value for attack graph visualization.] In the analysis of hardening measures, initial condition user(0) was first removed from the graph, since this is the attacker's initial privilege on his own machine, which the network administrator cannot control. The forward analysis pass (described in the previous section) then detects 2 cycles:

1. user(1)→rsh(1,2)→user(2)→ftp_rhosts(2,1)→trust(1, 2)→rsh(2,1)→user(1)
2. user(1)→rsh(1,2)→user(2)→sshd_bof(2,1)→user(1)

The postconditions user(1) of rsh(2,1) and user(1) of sshd_bof(2,1) are removed from the graph, since they have the highest graph distances within their respective cycles.

In the subsequent backward phase of analysis, the condition root(1) and the exploit local_bof(1) are removed from the graph, since they are not backward-reachable from the goal (i.e., they are a "dead end" in terms of the attack). Also, exploit sshd_bof(2,1) is removed in the backward pass since its remaining postcondition user(1) was removed in the forward pass because of a cycle. Similarly, exploits ftp_rhosts(2,1) and rsh(2,1) are removed in the backward pass because of the pruning of postcondition user(1) of exploit rsh(2,1) in the forward pass.

Figure 5:
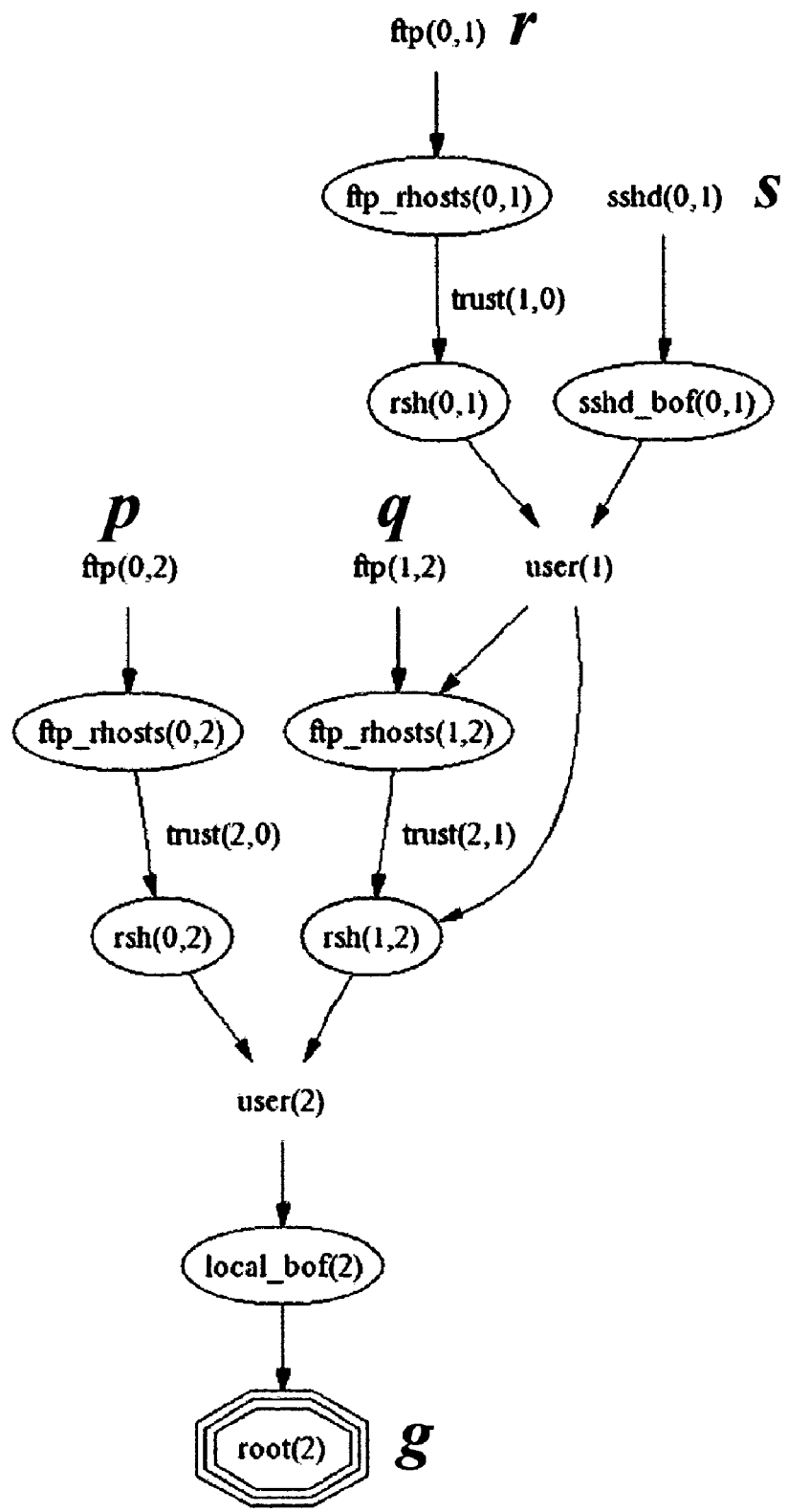
FIG. 5 shows an example exploit dependency graph resulting from forward and backward analysis phases.

FIG. 5 shows the exploit dependency graph resulting from the forward and backward analysis phases. As a comparison, note that the attack graph in [3] for this same example is considerably more complex (25 vertices and 43 edges), even though it uses an ordered binary decision diagram as a way to make the graph more compact. This is evidence in support of our position that exploit dependency graphs scale much better than traditional attack graphs. The reason is that the space of exploit dependencies (low-order polynomial) is much less complex than the space of security states (exponential).

For this example, we now construct an expression for the goal condition g in terms of the initial conditions, via traversal of the exploit dependency graph:

$$g = \text{root}(2) = rsh(0, 2) + rsh(1, 2)$$
$$= \text{ftp\_rhosts}(0, 2) + \text{ftp\_rhosts}(1, 2) \cdot \text{user}(1)$$
$$= c\_ftp(0, 2) + c\_ftp(1, 2) \cdot \text{user}(1) \cdot \text{user}(1)$$
$$= c\_ftp(0, 2) + c\_ftp(1, 2) \cdot [rsh(0, 1) + sshd\_bof(0, 1)]$$

-continued
$$= c\_ftp(0, 2) + c\_ftp(1, 2) \cdot c\_ftp(0, 1) + c\_ftp(1, 2) \cdot c\_sshd(0, 1)$$
$$\equiv p + qr + qs$$

Here, the plus symbol denotes disjunction (Boolean OR) and the dot symbol denotes conjunction (Boolean AND). Also, for notational simplicity the initial conditions were renamed as p≡ftp(0,2), q≡ftp(1,2), r≡ftp(0,1), s≡sshd(0,1), and the goal condition as g≡root(2).

Given the expression g=p+qr+qs for the attack goal in terms of initial conditions, g was converted to canonical conjunctive normal form. This yields the attack goal as a conjunction of maxterms, each maxterm representing a safe assignment of initial conditions. That is, the set of maxterms represents all possible safe assignments. For network hardening, each non-negated initial condition in a maxterm should be assigned false to provide safety.

Thus for the first example we have $$g = p + qr + qs$$
$$= (p + q + r + s) \cdot (p + q + r + s') \cdot (p + q + r' + s) \cdot$$
$$(p + q + r' + s') \cdot (p + q' + r + s)$$

Here the prime symbol denotes negation (Boolean NOT). In principle, the network could be hardened by selecting one of the maxterms, and take hardening measures that eliminate the vulnerability associated with each unprimed initial condition.

However, it is apparent that among the maxterms, not all are equally desirable. Generally speaking, there is some cost associated with each network hardening measure. Therefore, maxterms that have minimal impact on the network (involve fewer hardening measures) where looked for, which corresponds to minimizing unprimed initial conditions.

Figure 6:
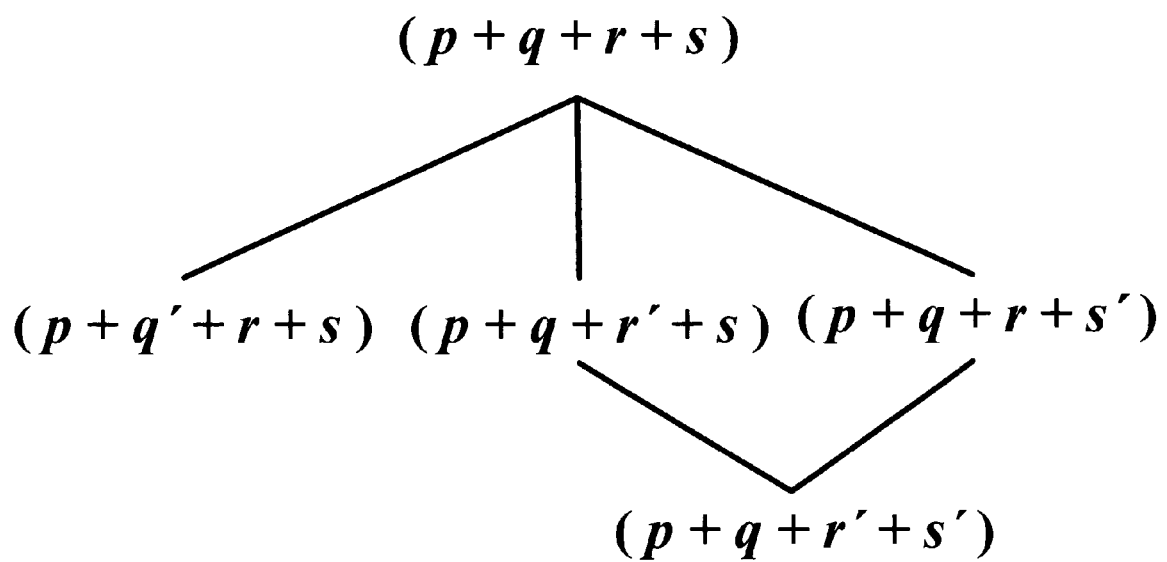
FIG. 6 shows and example Partial order of maxterms for minimal-impact hardening measures.

Thus, between a pair of maxterms, we choose one over another if all of the unprimed conditions in one also appear unprimed in the other. We can partially order maxterms in this fashion. FIG. 6 shows the partial order of maxterms for this example.

For minimal-impact network hardening, the minimal maxterms in the partial order are selected, i.e. those that have no maxterm below them. For this example, the 2 maxterms (p+q+r'+s') and (p+q'+r+s) are selected. These 2 maxterms correspond to 2 minimal-impact hardening options:

1. Harden ftp(0,2) and ftp(1,2), or
2. Harden ftp(0,2), ftp(0,2), and sshd(0,1)

The remaining maxterms, while still providing safety, have a greater impact on the network in terms of hardening measures.

In choosing among hardening options, the approach is to assign a cost to each individual hardening measure (initial condition). This could be performed by a network administrator, however, one skilled in the art will recognize that steps such as these could be performed by others, or even be automated. Then, the maxterm with the lowest total cost may be selected, where we sum only the costs for non-negated (unprimed) initial conditions.

In this example, since ftp(0,2) occurs unprimed in both maxterms, it can be disregarded in comparing total costs.

Therefore, it is preferable to compare the cost of hardening ftp(1,2) (Option 1) to the combined cost of hardening ftp(0,1) and sshd(0,1) (Option 2).

Since sshd represents a version of secure shell vulnerable to a buffer overflow attack, it may be assumed that its hardening cost is relatively low, e.g., installing a vendor patch. On the other hand, ftp may represent the existence of a properly functioning ftp service, which is simply used by the attacker in a clever way. Thus the way to harden this "vulnerability" is to block the service between the respective machines. In this case, the hardening cost is relatively high, i.e., the lack of service availability. So overall, the choice is dominated by the relative importance of offering the ftp service from machine 1 to machine 2 (Option 1) versus offering it from machine 0 to machine 1 (Option 2), perhaps with a slight bias toward Option 1, since Option 2 includes the low-cost patch to sshd.

Now considering a second example with a slightly more elaborate approach, e.g., with attacks at multiple layers of the TCP/IP stack. While the purpose of the first example was to show each step of the process, this example focuses on the resulting hardening measures and how a complicated set of exploits can be resolved to a simple set of hardening measures. Through this example it is explained how previously proposed exploit set minimization approaches [3] [4] [10] may be insufficient for network hardening, providing additional motivation for this approach.

Figure 7:
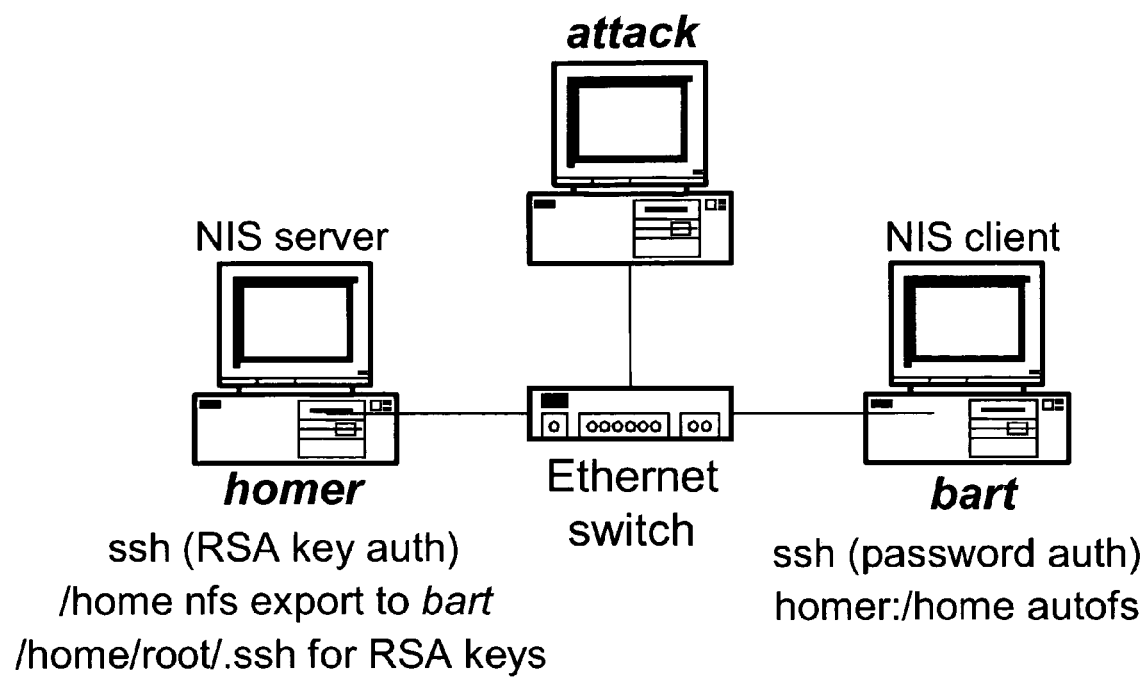
FIG. 7 shows a Network used in a second example.

FIG. 7 shows the network for the second example. An Ethernet switch provides connectivity at the link layer. At the transport layer, unused services have been removed, secure shell replaces FTP, telnet and other clear text password-based services, and there is tcpwrapper protection on RPC services. Application-layer trust relationships further restrict NFS and NIS domain access. FIG. 8 is table of exploits for this example and FIG. 9 is a table of security conditions for this example.

Figure 10:
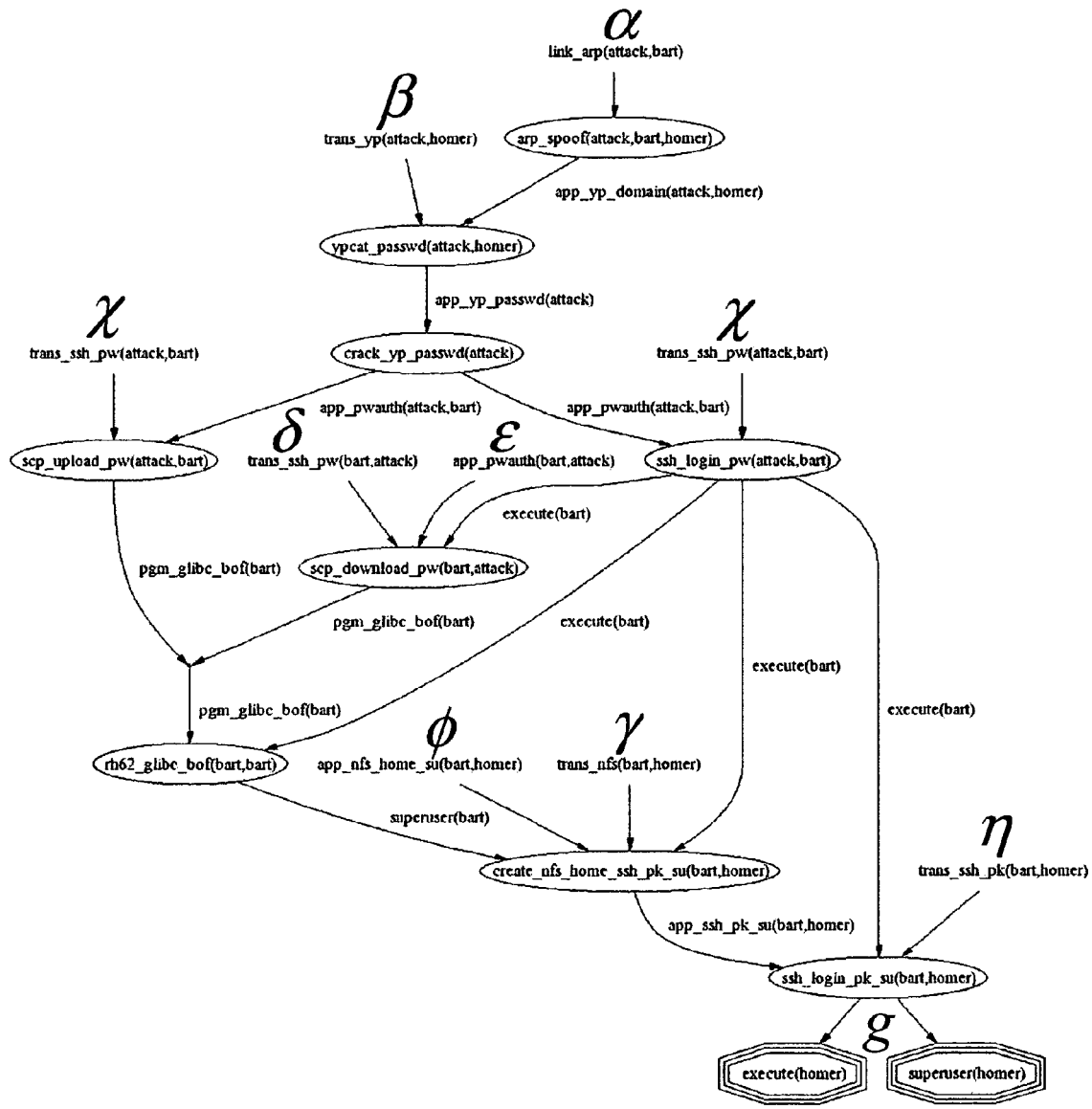
FIG. 10 shows an exploit dependency graph for a second example.

FIG. 10 is the resulting exploit dependency graph. In this graph, initial conditions that the network administrator cannot control have been removed, and the forward and backward graph analysis passes have been applied, as described in the previous section.

As before, the exploit dependency graph has been traversed to construct an expression for the attack goal g (execute access and superuser privilege on machine homer) in terms of the initial conditions:

$$g = (\alpha\beta\chi + \alpha\beta\chi\delta\varepsilon) \cdot (\phi\gamma) \cdot (\alpha\beta\chi) \cdot \eta$$
$$= \alpha\beta\chi\phi\gamma\eta$$

The exploit dependency graph has been reduced to an expression that leads to simple choices for network hardening. Note here that 2 initial conditions in the dependency graph do not appear in the expression for goal g:

$$\delta = \text{trans\_ssh\_pw}(bart, attack), \text{ and}$$
$$\varepsilon = \text{app\_pwauth}(bart, attack).$$

These drop out in this fashion:

$$\text{rh62\_glibc\_bof}(bart, bart) = \alpha\beta\chi + \alpha\beta\chi\delta\varepsilon$$
$$= \alpha\beta\chi(1 + \delta\varepsilon)$$
$$\alpha\beta\chi$$

Through the currently described approach, such irrelevant conditions as δ and ε do not get considered for network hardening. That is, the goal expression contains the necessary and sufficient set of initial conditions needed for network hardening decisions.

This kind of sufficiency is not present in previously proposed approaches to network hardening via proposed exploit set minimization [3] [4] [10]. These approaches search for minimal sets of (generic) exploits, where a minimal set is one in which every exploit is needed in reaching the goal.

In this example, there are 2 such minimal sets of exploits: the set of all exploits except scp_upload_pw(attack,bart), and the set of all exploits except scp_download_pw(bart, attack).

For network hardening using these minimal exploit sets, given no other information, one must assume that all exploits in the union of the minimal exploit sets must be stopped. In this example, one would conclude that the exploit scp_download_pw(bart,attack) must be stopped (via either δ or ε false in the initial conditions), even though stopping it has no effect on the attacker reaching the goal. Indeed, one could imagine that this exploit was the final one in a long chain of exploits, so that the entire chain would erroneously be considered critical to the attack.

Another observation is that assigning false to initial condition trans_ssh_pw(attack,bart) simultaneously stops 2 exploits, i.e., 1. scp_upload(attack,bart), and
2. ssh_login_pw(attack, bart)

This would not be apparent by looking at minimal exploit sets only. In other words, a single initial condition could control many exploits. General relationships among initial conditions and exploits can be many-to-many and arbitrarily complex. To solve the network-hardening problem, analysis must be at the level of initial conditions, as in our approach, and not at the level of exploits, as previously proposed.

Proceeding with the approach for this example, the attack goal expression g=αβχϕγη leads to the following 6 minimal-impact hardening options:

1. Harden link_arp(attack,bart), or
2. Harden trans_yp(attack,homer), or
3. Harden trans_ssh_pw(attack,bart), or
4. Harden app_nfs_home_su(bart,homer), or
5. Harden trans_nfs(bart,homer), or
6. Harden trans_ssh_pk(bart,homer)

Among these options, some assumptions about the relative costs of individual hardening measures may be made. For Option 1, link_arp involves the application of ARP (address resolution protocol) to map IP addresses to hardware (MAC) addresses. To harden link_arp, the network administrator could hard-code IP/MAC address and switch port relationships throughout the network. However, this has associated management overhead costs.

Option 4 app_nfs_home_su(bart,homer) is an application layer "connection" representing the sharing of the superuser home directory. This is a poor practice from a security standpoint (e.g., in this example it allows the overwriting of a secure shell authentication key pair), though the share was presumably created to make administration easier. It is easy to harden this by simply removing the file share.

For Option 3, trans_ssh_pw(attack,bart) could be hardened by modifying bart's sshd configuration to use public key authentication only (disable password authentication). This is a relatively low-cost option. In fact, this is already being done for homer.

The hardening measures for the remaining options (Options 2, 5, and 6) would make critical network services unavailable, i.e., their cost is too high. So overall, the choice comes down to hard-coding IP/MAC address relationships (Option 1), removing the superuser home directory file share (Option 4), and relying on secure shell public key authentication on bart (Option 3). Here Option 3 is the best (lowest cost) choice. This example illustrates how this approach can determine the best combination of lower-level vulnerabilities to harden for overall security.

Related Work

There are a number of tools available for vulnerability scanning, e.g. Nessus, Computer Oracle and Password System (COPS), McAfee CyberCop ASaP, and SAINT™ Scanning Engine. But no commercially available tools consider how attackers could combine low-level vulnerabilities to carry out an overall attack against specified network targets.

On the research front, model checking has been applied to the analysis of single hosts [1] as well as network wide [2]. In related work [14], model checking was used to discover attacks that could thwart intrusion detection systems. More recently [3] [4], the NuSMV model checker was modified to compute all attack paths (organized as a graph), rather than a single path.

However, model checkers have known scalability problems, a consequence of the exponential complexity of the general state space they consider. Indeed, model checkers performed poorly for the network attack models we experimented with in our early work, leading us toward the approach described in this disclosure.

For example, the work in [3] [4] attempts to reduce attack graph size using ordered binary decision diagrams. But the resulting graphs are still complex, even for the small examples described. Moreover, since the complexity of the algorithm for computing minimal critical attack sets is linear with the size of the attack graph, it again suffers from scalability problems. The work in [3] [4] also computes minimal critical exploit sets via model checking. However, as argued, such exploit sets are insufficient for network hardening. At any rate, embodiments of the presently disclosed invention are able to compute the same minimal critical sets with low-order polynomial exploit dependency representation, rather than with the exponential attack graph representation.

Graph-based approaches for analyzing attack combinations [5] [6] [7] [8] have generally suffered the same exponential state space problem. More recently, a scalable graph-based approach based on monotonic logic has been proposed [10] [11]. The approach described in this disclosure may be considered an extension of that work. That is, the representation for the purpose of computing safe network configurations is applied. To some extent, [10] does address network hardening by describing an algorithm for computing a minimal critical set of exploits. However, as argued, such exploit-level approaches are insufficient for network hardening.

In related work [15], graph-based attack models have been proposed for computing the likelihood of attacks. Also, there has been work that emphasizes the modeling rather than the analysis of attacks [16] [17]. The notion of modeling exploit sequences has been proposed for intrusion detection alert correlation [18]. Also, in [11], a method for generating elements of network attack models automatically via the Nessus vulnerability scanner is described.

SUMMARY AND CONCLUSIONS

Embodiments of the present invention go beyond traditional attack paths to compute network configuration hardening options that provide for the safety of given network resources. Assuming that relative costs have been assigned for individual hardening measures, the hardening options compute minimize overall cost.

The network hardening solutions provided are in terms of network configuration elements rather than exploits. Therefore, the often-complex relationships among exploits and configuration elements may be taken into account. In this way, hardening irrelevancies and redundancies that cannot be resolved through exploit-only approaches may be resolved.

The number of hardening options to consider may be greatly reduced by selecting only those options with minimal impact on the network. That is, ignore options that contain supersets of the same hardened components, since they incur additional cost but offer no additional safety.

Embodiments of the presently disclosed invention approach extend a recently proposed graph-based representation of exploit dependencies, based on monotonic logic. This representation has low-order polynomial complexity, as opposed to the exponential complexity generally found in earlier work. The assumption of monotonic logic also allows the resolution of cycles and other redundancies in the dependency graph via the graph distance from initial conditions.

From the resolved exploit dependency graph, an expression for the safety of given network resources may be computed in terms of initial network conditions. Minimal-impact safe values of the initial conditions may then be assigned via the minimal elements of the partial ordering of conjunctive normal form terms. From these minimal-impact assignments, the safe network configuration with minimum total cost may be found.

Because attackers often reach their goals through multiple exploits, network vulnerability analysis should consider the effects of combined vulnerabilities. The analysis of exploit sequences is a good first start. But what is really needed are explicit and manageable network hardening options that provide for safety, as we describe here.

REFERENCES

The following documents have been referenced throughout this disclosure to help describe various aspects and embodiments of the presently disclosed invention.

[1] C. Ramakrishnan, R. Sekar, "Model-Based Analysis of Configuration Vulnerabilities," in Proceedings of 7th ACM Conference on Computer and Communication Security, November 2000.

[2] R. Ritchey, P. Ammann, "Using Model Checking to Analyze Network Vulnerabilities," in Proceedings of IEEE Symposium on Security and Privacy, Oakland, Calif., 2000.

[3] O. Sheyner, J. Haines, S. Jha, R. Lippmann, J. Wing, "Automated Generation and Analysis of Attack Graphs," in Proceedings of IEEE Symposium on Security and Privacy, Oakland, Calif., 2002.

[4] S. Jha, O. Sheyner, J. Wing, "Two Formal Analyses of Attack Graphs," in Proceedings of 15th IEEE Computer Security Foundations Workshop, Nova Scotia, Canada, June 2002.

[5] R. Baldwin, Kuang: Rule based security checking, technical report, MIT Lab for Computer Science, May 1994.

[6] D. Zerkle, K. Levitt, "Netkuang—A Multi-Host Configuration Vulnerability Checker," in Proceedings of the 6th USENIX Unix Security Symposium, San Jose, Calif., 1996.

[7] C. Phillips, L. Swiler, "A Graph-Based System for Network-Vulnerability Analysis," in Proceedings of the New Security Paradigms Workshop, Charlottesville, Va., 1998.

[8] L. Swiler, C. Phillips, D. Ellis, S. Chakerian, "Computer-Attack Graph Generation Tool," in Proceedings of DARPA Information Survivability Conference & Exposition II, June 2001.

[9] J. Dawkins, C. Campbell, J. Hale, "Modeling Network Attacks: Extending the Attack Tree Paradigm," in Proceedings of Workshop on Statistical and Machine Learning Techniques in Computer Intrusion Detection, Johns Hopkins University, June 2002.

[10] P. Ammann, D. Wijesekera, S. Kaushik, "Scalable, Graph-Based Network Vulnerability Analysis," in Proceedings of 9th ACM Conference on Computer and Communications Security, Washington, D.C., November 2002.

[11] S. Jajodia, S. Noel, B. O'Berry, "Topological Analysis of Network Attack Vulnerability," in Managing Cyber Threats: Issues, Approaches and Challenges, V. Kumar, J. Srivastava, A. Lazarevic (eds.), Kluwer Academic Publisher, 2003.

[12] E. Mendelson, Introduction to Mathematical Logic, 4th ed., Chapman & Hall, 1997.

[13] R. Ritchey, B. O'Berry, S. Noel, "Representing TCP/IP Connectivity for Topological Analysis of Network Security," in Proceedings of 18th Annual Computer Security Applications Conference, Las Vegas, Nev., December 2002.

[14] G. Rohrmair, G. Lowe, "Using CSP to detect Insertion and Evasion Possibilities within the Intrusion Detection Area," in Proceedings of BCS Workshop on Formal Aspects of Security, 2002.

[15] R. Ortalo, Y. Deswarte, M. Kaâniche, "Experimenting with Quantitative Evaluation Tools for Monitoring Operational Security," IEEE Transactions on Software Engineering, 25(5):633-650, September/October 1999.

[16] F. Cuppens, R. Ortalo, "LAMBDA: A Language to Model a Database for Detection of Attacks," in Proceedings of Third International Workshop on Recent Advances in Intrusion Detection, Toulouse, France, October 2000.

[17] S. Templeton, K. Levitt, "A Requires/Provides Model for Computer Attacks," in Proceedings of New Security Paradigms Workshop, Cork Ireland, 2000.

[18] P. Ning, Y. Cui, D. Reeves, "Constructing Attack Scenarios through Correlation of Intrusion Alerts," in Proceedings of the 9th ACM Conference on Computer & Communications Security, Washington D.C., November 2002.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

What is claimed is:

1. A tangible computer-readable medium encoded with a computer program for minimum-cost network hardening comprising the steps of:
  a) inputting a multitude of exploits, each of said "multitude of exploits" including at least one precondition mapped to at least one postcondition, at least one of said "multitude of exploits" being an initial-condition exploit, at least one of said "multitude of exploits" being a goal exploit, said "at least one precondition" being a logical combination of multiple preconditions;
  b) generating a dependency graph, by:
    i) generating a forward-reachable dependency graph by starting with said "initial-condition exploit" and iteratively:
      (1) creating a current mapping by mapping each of said "at least one postcondition" of each said "multitude of exploits" to corresponding said "at least one precondition" of said "multitude of exploits"; and
      (2) if said "current mapping" introduces a mapping cycle, then omit said "current mapping" from said "forward-reachable dependency graph"; and
    ii) generating a backward dependency graph using said "forward-reachable dependency graph" by starting with said "goal exploit" and iteratively mapping each of said "at least one precondition" of said "multitude of exploits" to corresponding "at least one postcondition" of said "multitude of exploits";
  c) constructing a goal conditions expression using said "dependency graph" by starting with said "goal exploit," for each of said "multitude of exploits" mapped on said "dependency graph," recursively:
    i) mapping each of said "at least one precondition" to the corresponding said "at least one postcondition;" and
    ii) substituting the associated said "logical combination of multiple preconditions" with a corresponding algebraic expression;
  d) using said "goal conditions expression," determine at least one set of safe network configurations; and
  e) choosing at least one of said "at least one set of safe network configurations" using hardening costs as a criterion.

2. A computer-readable medium according to claim 1, wherein at least one of said "at least one precondition" includes elements of a computer network that contributes to a network attack vulnerability.

3. A computer-readable medium according to claim 1, wherein at least one of said "at least one postcondition" includes elements of a computer network that contributes to a network attack vulnerability.

4. A computer-readable medium according to claim 1, wherein said "initial-condition exploit" represents the initial configuration of a network.

5. A computer-readable medium according to claim 1, wherein said "initial-condition exploit" has null preconditions.

6. A computer-readable medium according to claim 1, wherein said "goal exploit" represents a network attack goal.

7. A computer-readable medium according to claim 1, wherein said step of "using said 'goal conditions expression,' determine at least one set of safe network configurations" includes writing said "goal conditions expression" as a conjunction of disjunctions, each of said "disjunctions" containing safe network configuration initial conditions.

8. A computer-readable medium according to claim 1, wherein said step of "choosing at least one of said 'at least one set of safe network configurations' with the lowest hardening costs" includes performing a partial ordering analysis of safe network configurations.

9. A computer-readable medium according to claim 1, wherein said step of "choosing at least one of said 'at least one set of safe network configurations' with the lowest hardening costs" includes choosing safe network configurations with minimal hardening measures, said hardening measures being changes to said network configuration that remove at least one attack vulnerability.

10. A computer-readable medium according to claim 9, wherein said step of "choosing at least one of said 'at least one set of safe network configurations' with the lowest hardening costs" includes using a cost assigned to each hardening measure.

11. A computer-readable medium encoded with a computer program for minimum-cost network hardening comprising:
   a) an exploit imputer, said "exploit inputter" configured to receive a multitude of exploits, each of said "multitude of exploits" including at least one precondition mapped to at least one postcondition, at least one of said "multitude of exploits" being an initial-condition exploit, at least one of said "multitude of exploits" being a goal exploit, said "at least one precondition" being a logical combination of multiple preconditions;
   b) a dependency graph generator, said dependency graph generator configured to generate a dependency graph, by:
      i) generating a forward-reachable dependency graph by starting with said "initial-condition exploit" and iteratively:
         (1) creating a current mapping by mapping each of said "at least one postcondition" of each said "multitude of exploits" to corresponding said "at least one precondition" of said "multitude of exploits"; and
         (2) if said "current mapping" introduces a mapping cycle, then omit said "current mapping" from said "forward-reachable dependency graph"; and
      ii) generating a backward dependency graph using said "forward-reachable dependency graph" by starting with said "goal exploit" and iteratively mapping each of said "at least one precondition" of said "multitude of exploits" to corresponding "at least one postcondition" of said "multitude of exploits";
   c) a goal conditions expression constructor, said "goal conditions expression constructor" configured to construct a goal conditions expression using said "dependency graph" by starting with said "goal exploit," for each of said "multitude of exploits" mapped on said "dependency graph," recursively:
      i) mapping each of said "at least one precondition" to the corresponding said "at least one postcondition;" and
      ii) substituting the associated said "logical combination of multiple preconditions" with a corresponding algebraic expression;
   d) safe network configurations determiner, said "safe network configurations determiner" configured to," determine at least one set of safe network configurations using said "goal conditions expression; and
   e) safe network configurations selection mechanism, said "safe network configurations selection mechanism" configured to choose at least one of said "at least one set of safe network configurations" with the lowest hardening costs.

12. A computer-readable medium according to claim 11, wherein at least one of said "at least one precondition" includes elements of a computer network that contributes to a network attack vulnerability.

13. A computer-readable medium according to claim 11, wherein at least one of said "at least one postcondition" includes elements of a computer network that contributes to a network attack vulnerability.

14. A computer-readable medium according to claim 11, wherein said "initial-condition exploit" represents the initial configuration of a network.

15. A computer-readable medium according to claim 11, wherein said "initial-condition exploit" has null preconditions.

16. A computer-readable medium according to claim 11, wherein said "goal exploit" represents a network attack goal.

17. A computer-readable medium according to claim 11, wherein said step of "using said 'goal conditions expression,' determine at least one set of safe network configurations" includes writing said "goal conditions expression" as a conjunction of disjunctions, each of said "disjunctions" containing safe network configuration initial conditions.

18. A computer-readable medium according to claim 11, wherein said step of "choosing at least one of said 'at least one set of safe network configurations' with the lowest hardening costs" includes performing a partial ordering analysis of safe network configurations.

19. A computer-readable medium according to claim 11, wherein said step of "choosing at least one of said 'at least one set of safe network configurations' with the lowest hardening costs" includes choosing safe network configurations with minimal hardening measures, said hardening measures being changes to said network configuration that remove at least one attack vulnerability.

20. A computer-readable medium according to claim 19, wherein said step of "choosing at least one of said 'at least one set of safe network configurations' with the lowest hardening costs" includes using a cost assigned to each hardening measure.

* * * * *